(12) United States Patent
Cinkler

(10) Patent No.: US 6,628,618 B1
(45) Date of Patent: Sep. 30, 2003

(54) METHOD AND TOOL FOR PRODUCING A TELECOMMUNICATION NETWORK

(75) Inventor: Tibor Cinkler, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/434,443

(22) Filed: Nov. 5, 1999

Related U.S. Application Data

(63) Continuation of application No. PCT/EP98/02614, filed on May 4, 1998.

(30) Foreign Application Priority Data

May 6, 1997 (DE) .......................................... 197 19 170

(51) Int. Cl.$^7$ ............................................... H04L 12/56
(52) U.S. Cl. ....................... 370/238; 370/252; 370/400; 455/352
(58) Field of Search ................................ 370/229, 235, 370/237, 238, 241, 252, 253, 351, 400; 455/352; 379/912

(56) References Cited

U.S. PATENT DOCUMENTS

| | | | |
|---|---|---|---|
| 4,939,726 A | | 7/1990 | Flammer et al. |
| 5,488,608 A | * | 1/1996 | Flammer, III ............... 370/400 |
| 5,754,543 A | * | 5/1998 | Seid ........................... 370/351 |
| 5,966,658 A | * | 10/1999 | Kennedy et al. ............ 455/426 |

FOREIGN PATENT DOCUMENTS

| WO | WO 98/51045 | * 11/1998 | ........... H04L/12/56 |
|---|---|---|---|

OTHER PUBLICATIONS

S.B. Bade, "SNA Route Generation Using Traffic Patterns", IBM Systems Journal, vol. 30, No. 3, pp. 250–258, Jan. 1, 1991.

A. Faragó et al., "An ATM Network Planning Model," ATM Networks I., Special Issue of Journal on Communications, vol. XLVII, Jan. Feb. 1996, Budapest.

\* cited by examiner

*Primary Examiner*—Melvin Marcelo
*Assistant Examiner*—Derrick W. Ferris

(57) ABSTRACT

The invention concerns a method for producing a telecommunication network, comprising the steps of determining geographical locations of exchange nodes and equivalent distances between these, and traffic capacities between node pairs based on the expected traffic volume between the respective nodes. The node pairs are at first sorted such that an expression S for each node pair is non-decreasing, S being a strictly monotonic increasing function of the equivalent distance and a strictly monotonic decreasing function of the traffic capacity between the nodes of the pair. For each node pair in this order, then a path P is selected for implementation among all possible paths, which path P satisfies the condition that (I) is minimum. In this expression k, n is an index for all links of the path and for all links of the path not yet selected for implementation in any previous step, respectively, C1 is selected in accordance with link implementation costs per distance unit, C2 is selected in accordance with link implementation costs per distance unit and per traffic capacity unit, Dk and Dn are the equivalent distances for the node pair belonging to link k and to link n, respectively $$C(P) = T(i,j) \cdot \sum_k C2 \cdot Dk + \sum_n C1 \cdot Dn. \qquad \text{(I)}$$

14 Claims, No Drawings

METHOD AND TOOL FOR PRODUCING A TELECOMMUNICATION NETWORK

This application is a continuation of application Ser. No. PCT/EP98/02614 filed May 4, 1998.

This application claims priority under 35 U.S.C. §§119 and/or 365 to 197 19 170.3 filed in Federal Republic of Germany on May 6, 1997; the entire content of which is hereby incorporated by reference.

The present invention relates to a method and a tool for producing a telecommunication network.

A telecommunication network suitable for providing telecommunication services over a large geographical area, comprises a plurality of nodes distributed over the area to be serviced. Between some of these nodes links are provided enabling the network to establish connections between the nodes of the network such that every subscriber connected to any given node of the network can reach every other subscriber connected to any other node of the network via such links between adjacent nodes. The term "link" refers to a physical connection between a pair of nodes which connection does not include any other node.

In order to ensure that the network meets the service demands, it is feasible to provide an individual link between each pair of nodes of the network. If the number of nodes of the network is N, the total number of links between nodes will then be N(N−1)/2. While this solution allows that two subscribers communicate with each other without involving any other nodes than the nodes immediately interfacing to the two subscribers, a network with a larger number of nodes would require an excessively high number of links, resulting in enormous costs for the implementation of the network.

Therefore, networks with a large number of nodes allow that communication paths are established between pairs of nodes, the paths consisting of a plurality of links between a corresponding plurality of pairs of nodes, such that a communication between a first node and a second node is handled by all other nodes along the path. That is, a path consists of one or more links connected in series. As an immediate consequence of this architecture, links connecting pairs of nodes will generally have to bear not only the traffic originating from the subscribers connected to the nodes connected by the link, but also traffic originating from subscribers connected to nodes connected via a path using this link. Accordingly, while in this network the total number of links is smaller than in the case that an individual link is provided between each pair of nodes, i.e. the fully connected case, the traffic capacity of the implemented links will possibly have to be higher than in the fully connected case.

Moreover, a telecommunication network usually has to after a high degree of reliability. In order to make sure that communication is possible between every pair of nodes even in case that a given number of links or nodes fail to operate, there may exist the requirement that every pair of nodes of the network is connected with each other via not less than a given number of disjoint paths which is by one higher than the given number of links or nodes which may fail without affecting the proper operation of the network. Here, a plurality of paths connecting the same pair of nodes is called disjoint if each link of the plurality of paths is not used by any other of these paths. A plurality of paths connecting the same pair of nodes is called node-disjoint if each node along each path is not used by any other of these paths.

The physical effort necessary for implementing a link between two nodes depends on geographical conditions and on the traffic capacity to be handled by the link. A measure for the effort required for implementing a link are the link implementation costs. As a generalization, the link implementation costs are a link attribute indicating how much physical effort is required for implementing the respective link.

It is the object of the present invention, to provide a method and a tool of producing a telecommunication network with low implementation costs in the above sense, the network satisfying the traffic demand between all pairs of nodes of the network.

According to the present invention, this object is solved as defined in claim 1 and 14, respectively. Advantageous embodiments of the present invention are given in the dependent claims.

The present invention takes into account that in terms of the link implementation costs discussed above, the most expensive part of a link is the physical action of laying cable from one node to the other. In comparison with this part of the implementation costs, the part of the implementation costs for providing a required transmission capacity is significantly smaller. The method according to the present invention takes this into account by means of selecting a path with the least implementation costs at first between less remote node pairs with a higher traffic demand and then between more distant node pairs with a higher traffic demand. In this way, the paths between nodes with small distance and high traffic demand are optimized with emphasise on the part of the implementation costs due to the geographical conditions. Moreover, when a new path has to be selected for implementation between a given pair of nodes, according to the invention the path selection takes into account the links already selected for implementation in a previous step, in order to save portions of the link implementation costs resulting from the necessity to prepare for the laying of cables. The present invention exploits the fact that once such preparations have been taken, substantially no additional effort of this kind is required for increasing the traffic capacity of the link. Accordingly, the present invention provides a method of producing a telecommunication network with a low implementation costs, given the nodes of the network, their geographical location and the traffic capacity demand between each pair of nodes of the network.

The term "equivalent distance" or "equivalent length" takes into account that the decision whether one link with a given traffic capacity is easier to implement than another link with the same traffic capacity, not only depends on the distance between the nodes but also on the geographical conditions along the link. As an example, the equivalent distance between two nodes linked by a buried link, is larger than the equivalent distance between two nodes at the same given distance which can be linked via a microwave link. Similarly, the equivalent length of a buried link is larger than for a link through a tunnel or the like already available. As a simple but less preferable approximation for the equivalent distance between two nodes, their geographical distance can be taken. In the same way, the equivalent length of a link or a path can be approximated by the physical length.

A preferred embodiment of the method of producing a telecommunication network according to the present invention guarantees that the implementation costs for the whole network, i.e. the sum of all link implementation costs is low and that at the same time each pair of nodes is connected via a gotten number of disjoint paths predetermined in accordance with the reliability requirements of the network.

According to a preferred embodiment of the present invention, the influence of the traffic capacity demand on the selection of the path is reduced the larger the number of paths becomes which are already selected for implementation. According to this embodiment, for a larger influence of the traffic capacity demand on the selection of paths for implementation, mainly the links already existing will be used to built new paths. If the influence of the traffic capacity demand is reduced shorter paths will be selected for implementation and more new links will be selected for implementation.

According to an embodiment of the present invention, the overall implementation costs are further optimized by means of trying to do without links selected for implementation for which the ratio between its effective link length to its physical length and to its traffic capacity is very high. This optimization is achieved by means of calculating the overall network implementation costs for the case that this particular link is not available and that instead, additional paths have been implemented for satisfying the traffic capacity demand and the reliability requirements of the network, and depending on the comparison of the overall implementation costs with the implementation costs of the network having the particular link implemented, either selecting the additional paths for implementation or maintaining the selection of the particular link for implementation.

In the following, preferred embodiments of the present invention will be described in greater detail:

A preferred embodiment of a method of producing a telecommunication network in accordance with the present invention begins with the determination of geographical locations of the network exchange nodes RI to Tm of the m nodes to be interconnected via the network. Once these geographical locations are determined, equivalent distances $D(i,j)$ between all pairs $N_i$, $N_j$ of nodes can be determined based on the relative geographical locations of the nodes of each pair. Preferably, the determination of equivalent distances furthermore takes into account the properties of the geographical area between each pair of nodes. The term "equivalent distance" is to be understood as an attribute assigned to each pair of nodes. This attribute describes e.g. the length of cables needed for connecting the respective pair of nodes. It is apparent that as an approximation, the equivalent distance equals the geographical distance between the nodes but will in most cases differ from the geographical distance due to the fact that very often, a link between two nodes not only consists of cables but also uses other transmission means like microwaves links not requiring the laying of cables. For each microwave converter, a fixed cable length equivalent of e.g. 1 km can be assumed such that the equivalent distance between a pair of nodes is the sum of the length of the parts of the link implemented in cable plus the equivalent length of each microwave converter along the link. According to a further refinement of the equivalent distance of a link, the length of link portions implemented in cable that needs to be buried, is weighted with a weight factor greater than one whereas the length of link portions implemented in overland cable lines adds to the equivalent distance with the weight factor 1.

In the next step, traffic capacities $T(i, j)$ are determined between all pairs of nodes $N_i$, $NJ$ based on the expected demand of traffic to be carried between node $X_i$ and node $N_j$.

Then, for each pair of nodes, an expression $S(i,J)$ is evaluated which is a strictly monotonic increasing function of the equivalent distance $D(i,j)$ of the pair $N_i$, $N_j$ and a strictly monotonic decreasing function of the traffic capacity between the node pair $N_i$, $NJ$. This expression $S(i,j)$ is used for sorting all node pairs $N_i$, $NJ$ such that $S(i,J)$ is non-decreasing. In other words, all pairs of nodes are arranged in a sequence such that the first pair of nodes in this sequence has a smallest $S(i,j)$ and each next pair of nodes has a $S(i,j)$ not smaller than that of the preceding pair of nodes in the sequence.

According to a simple and preferable embodiment the expression $S(i,j)$ can be $$S(i,j)=D(i,j)/D\text{max}-\alpha\, T(i,j)/T\text{max}.$$

In this equation, $D\text{max}$ and $T\text{max}$ are normalization constants and $\alpha$ is a real number between 0 and 1. The parameter $\alpha$ determines the influence of the traffic capacity between pairs of nodes on the order of the node pairs. For larger values of $\alpha$, node pairs with a heavy traffic load are preferred to node pairs with a slightly smaller equivalent distance and a less heavy traffic load. On the other hand, for small values of $a$ the order of the node pairs is mainly determined by the equivalent distance $D(i,j)$.

In a next step, for each node pair $N_i$, $N_j$ in said order, beginning with the first node pair in the sequence, i.e. beginning with a node pair having a smallest $S(i,j)$, a path $P$ between the nodes $N_i$ and $N_j$ of the pair is selected for implementation, the selection being made among all possible paths each consisting of at least one link connecting two nodes. The selection among all these paths is made according to the criterion that the implementation of the path can be achieved with the least effort. Preferably, among all possible paths between the node pair $N_i$, $N_j$, that path $P$ is chosen for which $$C(P) = T(i, j) \cdot \sum_{k} C2 \cdot Dk + \sum_{n} C1 \cdot Dn$$

is minimum, $k$ being an index for all links of the path, $n$ being an index for all links not yet selected for implementation in any previous step of the path; $C1$ being a positive real number selected in accordance with link implementation costs per unit distance, $C2$ being a positive real number selected in accordance with link implementation costs per unit distance and per unit traffic capacity; $Dk$ being the equivalent distance for the pair of nodes associated with link $k$, $Dn$ being the equivalent distance for the pair of nodes associated with link $n$.

This selection of paths between node pairs ordered in the order as described above and such that $C(P)$ is minimum, results in that at first those paths are selected for implementation which are short and which have to carry a comparatively large amount of traffic. Moreover, all node pairs connected in the order mentioned above, take advantage of links already selected for implementation in a preceding step of connecting a node pair. If a path uses links already present, it is sufficient to increase the traffic capacity of these links whereas no additional effort needs to be taken with respect to the laying of cables and the like. In this way, the method according to the present invention results in an efficient and cheap network.

According to an advantageous modification of this embodiment, the selection of paths between node pairs ordered as described above and such that $C(P)$ is minimum, is based on a modified expression $C(P)$ as follows:

$$C(P) = T(i, j) \cdot \sum_{k} \beta(k) \cdot C2 \cdot Dk + \sum_{n} C1 \cdot Dn$$

By means of introducing a weight factor $\beta>0$ for each link of a path it is possible to artificially increase or decrease the portion of the link implementation costs which arises from increasing the traffic capacity of the link by $T(i,j)$. By default, β(k)=1. Thus, β can be used for exerting influence on the path selection mechanism as to whether the selection of new links for implementation or the increase of the traffic capacity of existing links is preferable. The weight factor β can be determined to be the same for all links considered for selection or can be determined individually for each link or groups of links. If a new path to be selected should preferably use links already selected for implementation, β is decreased. If, on the other hand, a new path to be selected should preferably use new links not yet selected for implementation, β is increased in order to influence the selection mechanism by suggesting that traffic capacity is expensive.

Preferably, after each selection of a path for implementation, β is decreased. If the selection of paths starts with β=1 for each possible link and β is decreased after each selection of a path, the selection of links for implementation will progress such that at first there is a tendency to build new links, preventing the occurrence of many "dead ends", i.e. nodes of degree one, in the network. The term "degree of a node," indicates the number of links connected the node. With the number of paths of the network increasing, the pace of growing will become lower, resulting in an efficient network. This can be further refined by specifically changing β(k) for specific groups of links, e.g. by means of increasing β or keeping it constant for a group of links connected to nodes of degree one while decreasing β for all other links not belonging to that group.

Moreover, changing the value of β can be used for guaranteeing the maximum length of that path of a node pair which has the lowest C(P). If, for example, a condition has to be met that the path with lowest C(P) of a node pair must not be longer than a predetermined multiple of the geographical distance between the nodes connected by the path and/or must not use more than a predetermined number of intermediate nodes, this condition is checked at the end of the procedure for selecting links for implementation. If this condition is not satisfied for at least one node pair, the parameter β for all node pairs is temporarily increased and the process of selecting links for implementation is repeated for each node pair not satisfying this condition. If this condition is not satisfied for any of the paths, the value of β is increased, otherwise it is decreased by half of the size of the previous step. This procedure can be continued according to the binary search algorithm.

According to a preferred embodiment, the method of producing a telecommunication net-work according to the invention ensures that between each pair of nodes there exist at least Q disjoint paths. The provision of Q disjoint paths between each pair of nodes enables the network to provide full service between all nodes even if Q−1 links of the network fail. In the following, the provision of Q disjoint paths between each pair of nodes Ni, Nj is called Q-connectivity of the network. In order to achieve Q-connectivity, the following steps are repeated Q−1 times, q being a running index from 2 to Q:

For each node Ni of degree less than q, an associated node Nj is selected for which the equivalent distance $D(i,j)$ is minimum.

Between each node Ni of degree less than q and its associated node Nj, a q-th path Pq is selected among all possible paths between Ni and Nj which do not have any link in common with any other paths between Ni and Nj already selected in a previous step. This ensures that the q-th path Pq is disjoint with all other paths implemented between the nodes Ni and Nj. If desired, the q-th path Pq is selected among all possible paths between Ni and Nj which are node-disjoint with all other paths between Ni and Nj already selected in a previous step, in order to further increase the reliability of the network also in view of node failures. Moreover, this selection is made such that the q-th path Pg can be implemented with the least effort. Therefore, among all possible paths disjoint with all paths already implemented between Ni and Nj, that path Pq is selected as the q-th path, for which the above expression C(Pq) is minimum.

As this step has been performed for all nodes Ni of degree less than q, each node of the network now has a degree of at least q.

Subsequently, for all remaining node pairs Ni, Nj a q-th path Pq is selected in accordance with the same principles just described, resulting in a network having at least q disjoint paths between each pair of nodes Ni, Nj.

Repeating this procedure up to q=Q results in a network having the desired Q-connectivity.

According to a preferable refinement of this embodiment for establishing Q connectivity, the pairs of nodes Ni with degree less than q and its associated nodes Nj are sorted such that an expression $S_1(i,j)$ is non-decreasing, the expression $S_1(i,j)$ being a strictly monotonic increasing function of the equivalent distance $D(i,j)$ and a strictly monotonic decreasing function of the traffic capacity $T(i,j)$ between node Ni and node Nj. The selection of the q-th path for each pair of nodes Ni of degree less than q and associated node Nj is then performed in this order, starting with a node pair for which $S_1(i,j)$ is minimum, each next node pair having a $S_1(i,j)$ not smaller than $S_1(i,j)$ of the node pair processed before.

The expression $S_1(i,j)$ can be equal to $S(i,j)$ given above.

According to a preferred embodiment, the sorting procedures of the node pairs, that is either the sorting procedure used in the initial process of selecting a path P between each pair of nodes, or the sorting procedure for selecting a q-th path Pq between each pair of nodes, or both sorting procedures can be further refined by means of taking into account the degree of the nodes of each pair. According to this preferable embodiment, $S(i,j)$ and/or $S_1(i,j)$ is a strictly inonotonic increasing function of the equivalent distance $D(i,j)$ and a strictly monotonic decreasing function of the traffic capacity $T(i,j)$ and is furthermore a strictly monotonic increasing function of the number $K(i)$ of all links already selected for implementation in any previous step and a connected to node Ni, and of the number $K(j)$ of all links already selected for implementation and connected to node Nj.

This modification of $S(i,j)$ is advantageous in that nodes are connected with preference which have a low degree, for instance such nodes constituting a "dead and" in the network. If such nodes are connected first, a fewer number of link needs to be added when establishing the Q-connectivity of the network.

In the following, an embodiment for assigning traffic capacities to each of the links selected for implementation will be described. According to this embodiment, among all paths previously selected for implementation between a pair of nodes, a shortest path is found for which the sum of the link lengths is minimum. In this way, for each pair of nodes one path of minimum length is found. These paths are called primary path.

The assignment of primary link traffic capacities takes place as follows. For each pair of nodes Ni, Nj the traffic: capacity to be carried bet ween these two nodes, is known. The assignment of the link traffic capacities starts with each link traffic capacity being zero. Then, the traffic capacity of each link making up the path between nodes Ni and Nj is increased by the traffic capacity between these nodes. This step is repeated for the respective primary paths of all pairs of nodes, resulting in primary link traffic capacities for each link to be implemented in the network.

Preferably, in a next sequence of steps backup capacities are calculated for each link to be implemented, in order to provide sufficient traffic capacity in case that one or more of the links in the network fails. In the network now obtained, a link may be used by more than one path. Bach path belongs to a node pair. Moreover, different paths having at least one link in common, necessarily belong to different node pairs. This results from the fact that all paths connecting the same pair of nodes, are disjoint or even node disjoint, as explained above. As a consequence, if a link is cut, then all node pairs with a primary path using this link, will have to resort to a secondary path. Then it can happen that a link is used by more than one secondary path.

In order to assign backup traffic capacities to each link of a network, at first, a backup traffic capacity value B of each link is set to zero. Then, for each link selected for implementation of the network the following steps are performed.

For each pair of nodes Ni, Nj connected by a primary path using the link, a respective secondary pat, preferably a second shortest path is found, for which the sum of its link lengths (preferably, equivalent link lengths) is minimum if the primary path is left aside. Then, for each link of all second shortest paths thus found a respective traffic capacity sum TC is calculated by summing up the traffic capacities of all secondary paths using the respective link. It is noted that the traffic capacity of a secondary path is equal to the traffic capacity of its primary path, as the secondary path has to back up the traffic normally handled by the primary path between node Ni and Nj. Then, if the backup traffic capacity value B of the respective link is smaller than TC of the respective link, B of the respective link is set to TC of that link.

This assignment of backup capacities can be performed in a similar manner for all secondary paths up to the Q-th path in order to take account of the situation that Q−1 links of the network fail.

Having found the backup capacity of each link, the required traffic capacity Tk of each link then is the sum of its primary link capacity and of its backup capacity. The primary link capacity is the sum of the traffic capacity of all primary paths crossing the link.

Having found all links that are to be implemented and the traffic capacity of each of these links, the efficiency of the whole network can be estimated based on the number of links, the equivalent link length (equivalent distance) and the traffic capacity of each link. At this stage, a sequence of steps can be performed in order to eliminate inefficient links which render the network more expensive than necessary.

For each link selected for implementation, a coefficient q is calculated in proportion to the link implementation effort LC of the link and inversely proportional to the physical length of the link and to the link traffic capacity. The sum of LC(k) over all links k selected for implementation is called network implementation effort NC. The link implementation effort LC(k) of a link k equals $C2Dk \cdot Tk + C1 \cdot Dk$. C2, Dk, Tk of this equation are explained above in connection with the expression C(P).

In order to check whether the network implementation effort NC can be further reduced, the following steps can be performed for a link with the highest coefficient η, i.e. for a link with the least efficiency: At first, all paths selected for implementation are determined, which use this link. For each of these paths, an additional path between the same pair of nodes is selected for implementation, which additional path does not have any link or node in common with any other path of that node pair. Then, link traffic capacities for the links of all paths between nodes Ni and Nj including the additional path but excluding the path containing the link with the highest coefficient η are calculated as described above with respect to the primary path and the secondary path.

At this stage, a network is obtained that does no longer include said link with the highest coefficient η and that is able to meet the traffic demand between all pairs of nodes and provides Q-connectivity.

The network implementation effort NC of this new network is calculated and compared to NC of the previous network. If the implementation effort is smaller for the new network than for the previous network, the new network is more efficient than the previous network. This procedure for improving the network efficiency can be repeated for the new network based on the least efficient link of the new network until no further improvement is obtained.

A telecommunication network design tool according to the present invention comprises a central processing unit for executing the method described above. It furthermore comprises a program memory and a random access memory for storing data regarding the equivalent distances between the plurality of node pairs of the telecommunication network and regarding the traffic capacities to be provided between each of these node pairs. A keyboard or other input means is provided for inputting these data into the memory.

The central processing unit processes these data according to the method described above and outputs pairs of nodes to be connected via a link. Preferably, also the required traffic capacities Tk of each of these links are output by the central processing unit. Outputting of the data can be performed by means of displaying the node pairs to be connected by a link, preferably together with the associated link traffic capacities Tk, on a display screen or by means of printing these data on paper.

These data are then taken for implementing the links selected for implementation, thus obtaining a telecommunication network ready for operation

What is claimed is:

1. A method of producing a telecommunication network, comprising the steps:

a) determining geographical locations of m network exchange nodes N1 to Nm, m being a positive integer;

b) determining equivalent distances D(i,j) between all pairs Ni, Nj of said nodes based on the relative geographical locations of the nodes Ni, Nj of each pair wherein i,j ∈ {1 , . . . , m} and i≈j;

c) determining traffic capacities T(i,j) between all pairs of nodes Ni, Nj based on the expected amount of traffic to be carried between node Ni and node Nj;

d) for all node pairs Ni, Nj, evaluating an expression S(i,j) which is a strictly monotonic increasing function of D(i,j) and a strictly monotonic decreasing finction of T(i,j);

e) ordering the node pairs Ni, Nj such that S(i,j) is non decreasing; and f) selecting in said order f or each node pair Ni, Nj among all possible paths each consisting of at least one link connecting two nodes, a path P between node Ni and Nj for implementation, for which path P $$C(P) = T(i,j) \cdot \sum_k C2 \cdot Dk + \sum_n C1 \cdot Dn$$

is minimum, k being an index for all links of the path;

n being an index for all links not yet selected for implementation in any previous step, of the path, C1 being a positive real number selected in accordance with link implementation costs per unit distance, C2 being a positive real number selected in accordance with link implementation costs per unit distance and per unit traffic capacity;

Dk and Dn, respectively, being the equivalent distance for the pair of nodes associated with link k, and link n, respectively.

2. The method of producing a telecommunication network of claim 1, further comprising the following steps repeated for q=2 to Q, Q being a positive integer greater than one and predetermined in accordance with the connectivity of the telecommunication network:

g) for each node Ni of degree less than q, selecting an associated node Nj for which D(i,j) is minimum;

h) for each pair of nodes Ni, Nj of step g), selecting for implementation a q-th path Pq among all possible paths between Ni and Nj not having any link in common with any other path between Ni and Nj already selected in a previous step, for which path Pq the expression C(Pq) is minimum;

i) for all remaining node pairs Ni, Nj selecting for implementation a q-th path Pq among all possible paths between Ni and Nj satisfying at least one of the conditions not having any link in common with any other path between Ni and Nj already selected for implementation in a previous step, for which path the expression C(Pq) is minimum, not having any node in common with any other path between Ni and Nj already selected for implementation in a previous step, for which path the expression C(Pq) is minimum.

3. The method of producing a telecommunication network of claim 2, wherein step g) further comprises the steps of:

g1) sorting the pairs of nodes Ni, Nj of step g) in an order such that S(i,j) is non-decreasing, S(i,j) being a real number between 0 and 1;

g2) performing step h) in the order according to step g1).

4. The method of producing a telecommunication network of claim 1, comprising the step of decreasing C2 after selecting a path for implementation.

5. The method of producing a telecommunication network of claim 2, comprising the steps performed for each pair of nodes Ni, Nj:

j) among all paths selected for implementation between Ni and Nj, finding a primary path for which the sum over all its links of the link lengths is minimum; and k) increasing a traffic capacity value of each link of said path by said traffic capacity determined in step c).

6. The method of claim 5, comprising the steps performed for each link selected for implementation, of the network:

l) among all paths connecting a respective node pair Ni, Nj connected by a primary path comprising the link, finding a secondary path other than the primary path found in step j), for which the sum over all its links of the link lengths is minimum; and m1) for each link of the secondary paths between all node pairs Ni, Nj satisfying the node pair condition of step 1), obtaining the sum TC of the traffic capacities of all secondary paths which include it; the traffic capacity of a secondary path being equal to the traffic capacity of its associated primary path;

m2) setting its backup traffic capacity value B to the maximum of the sum TC and of a backup traffic capacity value B assigned to it in a previous step; and m3) obtaining its link traffic capacity Tk as the sum of the primary link traffic capacity obtained in step k) and of its backup capacity B.

7. The method of producing a telecommunication network of claim 1, wherein the equivalent distance between a pair of nodes is determined in proportion to the geographical distance between the nodes.

8. The method of producing a telecommunication network of claim 1, wherein the equivalent distance between a pair of nodes is determined in proportion to costs arising for the implementation of a link having unit traffic capacity between the pair of nodes.

9. The method of producing a telecommunication network of claim 1, wherein $$S(i,j)=D(i,j)/D\max-\alpha T(i,j)/T\max;$$

α being a real number between 0 and 1; Dmax, Tmax being normalization constants.

10. The method of producing a telecommunication network of claim 1, wherein S(i,j) is a strictly monotonously increasing function of the number K(i) of links already selected for implementation and connected to node Ni, and of the number K(j) of links already selected for implementation and connected to node Nj.

11. The method of producing a telecommunication network of claim 10, wherein $$S(i,j)=D(i,j)/D\max-\alpha T(i,j)/T\max+K(i)+K(j).$$

12. The method of producing a telecommunication network of claim 6, further comprising the steps of:

n) for each link k selected for implementation, calculating a coefficient η in proportion to a link implementation effort LC(k)=C2·Dk·Tk+C1·Dk and inversely proportional to the physical link length and to the traffic capacity Tk of the link;

o) calculating the sum ΣLC of LC(k) over all links k selected for implementation;

p) for a link with the highest coefficient η, performing the steps of:

p1) determining paths selected for implementation between node pairs Ni, Nj which paths use the respective link;

p2) for each path determined in step p1) selecting an additional path for implementation between the nodes Ni, Nj of the path determined in step p1) said additional path not having any link in common with the path determined in step p1);

p3) calculating link traffic capacities according to steps to m) for the links of all paths between nodes Ni and Nj including the additional path but excluding the path determined in step p1);

p4) calculating the sum ΣLC of LC(k) over all links k selected for implementation, of the network;

p5) comparing the sum obtained in step o) with the sum obtained in step p4); and p6) if the sum obtained in step p5) is smaller than the sum obtained in step o), discard the selection of the link of step p) else discard the selection for implementation of the additional path of step p2).

13. The method of producing a telecommunication network of claim 1, comprising the step of implementing the links of each path selected for implementation.

14. A tool for producing a telecommunication network, comprising means for inputting and storing data related to equivalent distances between a plurality of pairs of exchange nodes of a telecommunication network and to traffic capacities to be provided between each pair of nodes;

means including a central processing unit, a working memory and a read only memory, adapted to perform a method according to any one of claims 1 to 12; and means for outputting pairs of nodes selected for connection by a link, in accordance with the paths selected for implementation.

* * * * *